UNITED STATES PATENT OFFICE.

WINDSOR LELAND, OF CHICAGO, ILLINOIS.

IMPROVEMENT IN PROCESSES OF PRESERVING MEAT.

Specification forming part of Letters Patent No. 176,652, dated April 25, 1876; application filed October 8, 1875.

*To all whom it may concern:*

Be it known that I, WINDSOR LELAND, of the city of Chicago, county of Cook, and State of Illinois, have invented a new and useful Process for Preparing and Fitting Meat for Canning, and for preserving the same; and I hereby declare the following to be a full and accurate description of the same.

The object of my invention is the preservation of meats, seasoned or fresh, containing all their natural juices and flavors, with the water or watery portions of the same eliminated, yet sufficiently moist to be palatable.

My process consists of the following manipulations: First, if the meat be already seasoned, I cook the same by boiling or steaming the same until it is fit for food. If not seasoned, I either season it before cooking or during the process of cooking. Second, I then cut, chop, or separate into fragments the meat after the manner of preparing it for sausage. Third, I then expose the same to a process of drying, for the purpose of evaporating all the water or moisture which may be acquired by the meat during the process of cooking, as aforesaid. This method of treating the meat to be rid of the water is preferable to the process of pressing the juices from the meat for such purpose, as by such drying the natural juices and flavors of the meat are preserved, and not driven off with the water. Fourth, I then pack the meat thus prepared into air-tight vessels, carefully excluding the air by hermetically sealing the same. By this process I find I can preserve all kinds of meat, and the flesh of fowls, game, and the like, for any desirable time, and retain their natural flavors.

What I claim as my invention, and desire to secure by Letters Patent, is—

The herein-described process of preserving meats, the same consisting in first cooking the meat by boiling or steaming, then cutting or chopping it, then evaporating, as described, and finally sealing the meat so treated in air-tight cans, substantially as set forth.

WINDSOR LELAND.

In presence of—
- JOEL TIFFANY,
JOHN M. SPOONER.